May 23, 1944.　　　A. KEEFE　　　2,349,435
AIR VALVE
Filed Oct. 17, 1940
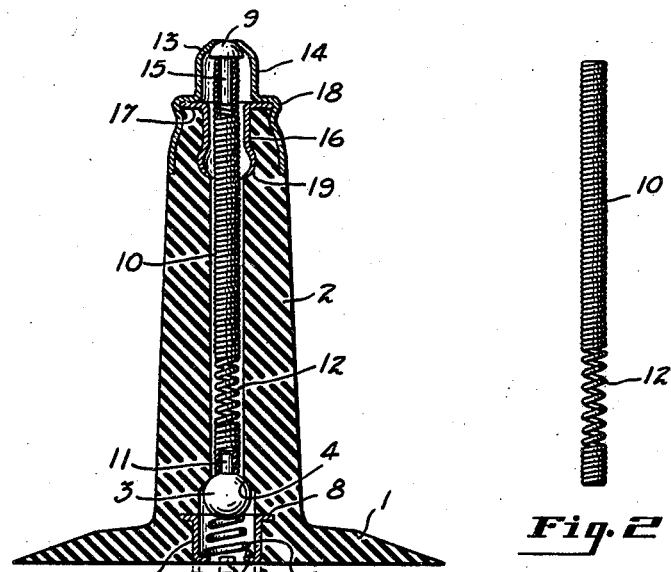
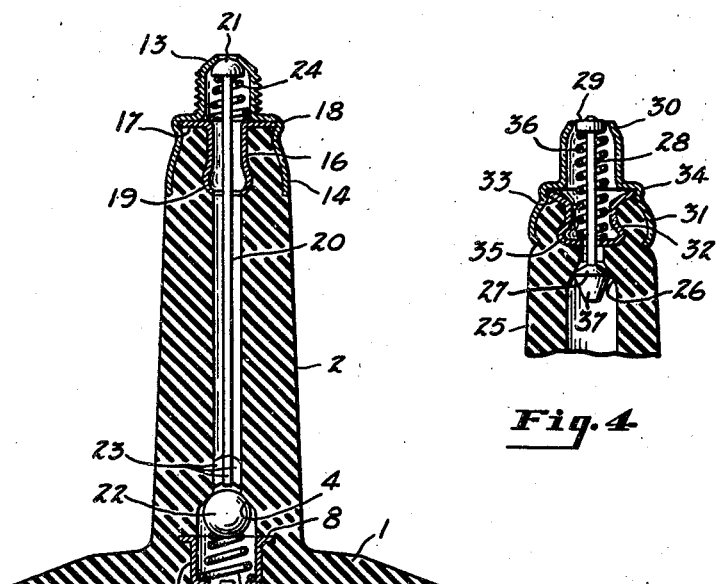
INVENTOR
*Arthur Keefe*
BY
*O. Z. McCoy*
ATTORNEY Patented May 23, 1944

2,349,435

UNITED STATES PATENT OFFICE 2,349,435

AIR VALVE

Arthur Keefe, Akron, Ohio

Application October 17, 1940, Serial No. 361,498

15 Claims. (Cl. 277—42)

This invention relates to air valves and more particularly to an improvement in and simplified adaptation to low internal air pressures of the invention that is disclosed in my Patent 2,057,195, issued on October 13, 1936, and this application is a continuation in part of my co-pending application, Serial No. 115,060, that was filed on December 10, 1936.

An object of the present invention is to provide an air valve device that consists of a small number of parts that are simply constructed and easily assembled.

Another object is to provide an improved automobile tire valve of the flexible valve stem type that is capable of long and efficient service.

Another object is to provide new and improved valve stem, ferrule, and closure assemblies.

With the above and other objects in view, that will be apparent to those familiar with the art to which the present invention pertains, illustrative embodiments of the present invention are disclosed in the accompanying drawing, wherein:

Fig. 1 is an elevational section of a tire valve device that has an improved clamped on type of ferrule and a pin carrying valve ball;

Fig. 2 is an elevation of the substantially closed wire spring that preferably forms the flexible compression member in the device that is shown in Fig. 1;

Fig. 3 is an elevational section of a valve device that embodies a further arrangement, with adaptations, of the elements of the other valve constructions that are shown herein; and Fig. 4 is an elevational section of a valve assembly showing another modification of the valve constructions that are contemplated in the present invention.

In the accompanying drawing, the tire valve base 1, is adapted for being permanently secured to an inner tube, or the like, and is continuous with the longitudinally apertured flexible valve stem 2.

The ball valve 3 is pressed into the body stock valve seat 4 to form a releasable air valve, by the compression spring 5, that is supported by the fingers 6 of the embedded spring support 7. The spring support 7 is preferably vulcanized in the body stock of the valve stem 2 with the radially extending flange 8 anchoring it in place. The fingers 6 of the spring support 7 are bent from their dotted line position to their full line position after assembly.

The ball valve 3 is disengaged from the valve seat 4 by pressure applied to the dust seal cap 9 and transmitted to the ball valve 3 by suitable flexible compression means, such as the substantially closed spring 10, into the lower end of which the ball valve pin 11 extends.

Compensation for wear of the rubber valve seat 4 is provided for by suitable means, as by the separation, as at 12, of one or more turns of the closed spring 10. The separated turns of the spring 10 must close under compression before the compression spring 5 can be depressed, to avoid valve leakage.

The dust seal cap plug 9 releasably contacts the inturned flange 13 on the outer ferrule member 14 in substantially water and dust sealing engagement. On the application of downwardly directed pressure to the plug 9, the plug is moved out of engagement with the ferrule flange 13 and down into the enlarged interior of the ferrule sufficiently for permitting the passage of air between the plug 9 and the ferrule flange 13. On the withdrawal of the application of pressure on the plug 9, the plug returns to its normal position against the flange 13. The dust seal cap plug 9 preferably engages the end of the closed spring 10, as by the pin 15 that is gripped by the radial contraction of the spring coils.

The clamped on type of ferrule comprises substantially a sheet metal sleeve that encloses and is crimped on the upper end of the valve stem 2. In this structure the rubber that forms the upper tip of the valve stem 2 is compressed and gripped between the inner ferrule member 16, with its radially outwardly extending flange 17 that overlies the end of the valve stem 2, and the outer ferrule member 14 that is crimped about the periphery of the inner ferrule flange 17, as at 18, to provide a secure grip thereon and an interlock therebetween. The inner member 16 is radially outwardly crimped, as at 19, to assist in locking the rubber of the valve stem between the inner member 16 and the sleeve portion of the outer ferrule member 14. The inner member 16 may be slipped into or molded in the upper end of the valve stem 2, as desired.

The valve structure that is shown in Fig. 3 is substantially an adapted assemblage of several parts of the previously described structure and these parts bear the same numbers in both figures. The wire compression pin member 20 is preferably rigidly secured at its upper end in the dust cap sealing plug 21 and is adapted at its lower end for engaging the air sealing ball valve 22, preferably by a plurality of radially extending vanes 23 that slidably engage the wall of the valve air conducting aperture to center the engagement between the pin or compression wire 20 and the ball valve 22. A proper clearance between the vanes 23 and the ball valve 22 compensates for wear of the valve seat 4. The compression spring 24, in the outer ferrule member, that may be threaded as shown, if desired, keeps the wire 20 in its uppermost position by engagement with the under side of the plug 21. The compression spring 24 is supported in any desired manner, as by having its lower end positioned on the inner ferrule flange 17, or the like.

Pressure applied downwardly on the closure plug 21 unseats it from its engagement with the ferrule flange 13 to permit air to pass freely therebetween. The pressure applied to the plug 21 is transmitted by the compression wire 20 and applied by the lower edges of the vanes 23 to the ball valve 22 to unseat the ball valve 22 from its engagement with the valve seat 4, and to permit the passage of air in either direction thru the axial aperture in the valve stem 2.

On the release of the pressure on the plug 21, the compression spring 24 returns the closure plug 21 to its engagement with the outer ferrule flange 13 to minimize the entrance of objectionable dust and water into the air conducting aperture in the valve stem 2, and withdraws the pressure of the vanes 23 on the ball valve 22. The ball valve operating compression spring 5 causes the ball valve 22 to seat in air sealing engagement against the valve seat 4 and to prevent the passage of air thru the axially extending air conducting aperture in the valve stem 2.

In the construction that is shown in Fig. 4, the valve stem 25 is also apertured axially for the conducting of air therethru. As in the previously described constructions, the air conducting aperture in the stem 25 is of a plurality of diameters or bores, to provide a downwardly facing valve seat 26 at substantially the junction of two of these bores, and at any desired position between the ends of the valve stem 25.

Suitable means, such as the valve 27, contacts the valve seat 26 in releasable air sealing engagement therewith. In the preferred construction, the inclination of the upper face of the valve 27 and the inclination of the valve seat 26 are so adjusted with respect to each other that the valve 27 engages its valve seat 26 farthest from the center of the stem 25 to permit a maximum flow of air between the periphery of the valve 27 and its valve seat 26, since this is believed to be the air flow bottle neck in modern air valve constructions. The valve 27 also preferably applies its closing pressure on its valve seat 26 of the stem 25 to minimize the radial spreading action of the rubber, or similar material of which the stem 25 may be made, which tends, in the valve stem spreading type of valve engagement, toward the formation of minute cracks in the rubber and in resultant air leaks in the rubber of the valve seat.

The valve 27 is caused to operate in any desired manner, as by being permanently mounted on the lower end of the wire valve pin 28 that is disposed axially of the stem 25 and in the air conducting aperture thereof. The closure member or dust cap sealing plug 29, is permanently mounted on the upper end of the wire valve pin 28 in any desired manner, as by being riveted thereon, or the like.

The plug 29 is adapted to cooperate with the radially inwardly inclined flange 30, that is disposed at the upper extremity of the outer ferrule member 31, to substantially exclude from the stem objectionable dust and water and other detrimental material.

The plug 29 is preferably suitably dimensioned so that it is removably insertable in the ferrule orifice and so that it may pass substantially freely thru the orifice that is defined by the outer ferrule flange 30, so that the valve 27 may continue to seat securely on its valve seat 26 throughout the life of the valve assembly, since the valve seat 26 may wear somewhat with continued use.

The rubber, or other suitable material of which the valve stem 25 may be made, that forms the upper tip of the valve stem 25, is gripped between the outer ferrule 31 and the liner or inner ferrule 32 in any desired manner, so that the ferrules may be substantially permanently mounted on the stem.

In the construction shown, the liner or inner ferrule member 32 has the radially outwardly extending upper flange portion 33, that overlies the end of the valve stem 25. The outer ferrule member 31 is crimped about the periphery of the inner ferrule flange 33, as at 34, to firmly secure, or interlock, the two ferrule members together on the free end of the valve stem 25. The inner ferrule member 32 is radially outwardly crimped, as at 35, to assist in locking the rubber of the valve stem 25 between the inner ferrule member 32 and the sleeve portion of the outer ferrule member 31. The lower edge of the outer ferrule member 31 may be crimped into the rubber of the outer surface of the valve stem 25, as shown, to improve the grip of the two ferrule members on the end of the stem 25, and may be continuous or separated into fingers, if preferred. The crimp 35, in the lower edge of the inner ferrule member 32, may, if desired, extend radially inwardly sufficiently to provide a seat, as shown, for the lower end of the spring 36, or the spring 36 may be made to rest on the flange 33 of the inner member 32, as is shown in Fig. 3, if that construction is preferred. The flange 33 of the inner ferrule 32 may be made flat or inclined, as desired. The parts of the device that are associated with the stem may be replaced, if desired, without the necessity of removing the stem from the inner tube. The lower edge, or fingers, of the outside ferrule may be bent away from the stem and the ferrule, spring and valve removed and replaced with new corresponding parts without vulcanization. The valve may terminate downwardly in the conical walls 37 to facilitate forcing it axially past its valve seat, if desired.

The spring 36 serves to actuate the valve 27 and the closure plug 29 by any suitable engagement that effectuates this result, as by having its upper end yieldingly bearing against the under side of the closure plug 29, as shown, or by other suitable arrangement. In the construction shown, when pressure is applied axially downwardly on the closure plug 29 and against the yielding pressure of the spring 26, the wire pin 28 transmits the pressure to the valve 27 and removes the valve 27 from its air sealing engagement with its valve seat 26 and permits the flow of air in either direction through the aperture that extends axially through the valve stem 25.

On the withdrawal of the application of pressure to the closure plug 29, the spring 26 causes the closure plug 29 to resume its upper position and its closure of the orifice in the upper end of the outer ferrule member 31, and causes the valve 27 to resume its air sealing engagement with its valve seat 26.

It is to be understood that the various forms of valve assemblies, and the parts of the valve assemblies, that are disclosed and described herein, are submitted for the purposes of illustration and explanation, and that various modifications, alterations, and interchanges may be made without departing from the invention as it is defined by the appended claims.

What I claim is:

1. A valve assembly, comprising in combination, a compressible apertured stem, an inner ferrule expanded radially against said stem, an inner ferrule flange overlying the end of said stem, an outer ferrule compressed radially against said stem, a radially inwardly extending flange forming the upper extremity of said outer ferrule, and a movably mounted plug in said outer ferrule making substantially dust sealing engagement with said outer ferrule flange.

2. A valve assembly, comprising in combination, a substantially compressible flexible rubber stem apertured axially for the passage of air therethrough, an inner ferrule in said stem aperture and radially deformed to grip said stem, an inner ferrule radially outturned flange portion overlying the end of said stem and confining said stem end against axial displacement, and outer ferrule permanently mounted on the outside of and extending beyond the end of said stem and overlying said inner ferrule thruout the length thereof axially of said stem, a radially inturned flange forming the upper extremity of said outer ferrule, a dust seal means releasably normally engaging said inturned flange to substantially minimize the entrance of dust and water into said stem aperture, valve means in said stem aperture for releasably preventing the passage of air therethru, and means carried by said dust seal means for operating said valve means.

3. A valve assembly, comprising in combination, an apertured flexible stem, an inner ferrule disposed in said stem aperture and having a radially outwardly extending flange portion overlying the end of said stem, an outer ferrule clamped about the periphery of said inner ferrule flange and terminating upwardly in a radially inwardly inclined flange, a dust seal plug in releasable dust sealing engagement with said radially inwardly inclined flange, a substantially collapsed spring in said stem aperture and engaging a part of said dust seal plug, and air sealing means in said stem aperture and operated by the depression of said plug and spring.

4. A valve assembly, comprising in combination, a flexible apertured stem, an inner ferrule having a flange overlying the end of said stem, an outer ferrule terminating upwardly in a radially inwardly directed edge, a dust seal cap making substantially dust sealing engagement with said outer ferrule edge, a wire thrust member carried by said cap and disposed in said stem aperture, wire centering means carried by said wire and bearing against the wall of said stem aperture, a valve seat in said stem aperture, a valve making releasable air sealing engagement with said valve seat, spring means yieldingly maintaining said valve on said stem valve seat, a spring resting on said flange and supporting said cap in dust arresting engagement with said edge and yieldingly supporting said wire and said wire centering means out of engagement with said valve.

5. An air valve assembly substantially as shown, comprising in combination, a flexible stem apertured for the passage of air therethru, a valve seat portion of said stem disposed in said aperture, a valve for engaging said valve seat, a ferrule embracing the outer end of said stem and secured thereto, a flange part of said ferrule defining an orifice thru which air may be admitted into said stem aperture, a closure means substantially closing said orifice against the admission of objectionable material into said stem aperture, means joining said valve with said closure means, and resilient means normally seating said valve on said valve seat and positioning said closure means in said orifice.

6. An air valve assembly substantially as shown, comprising in combination, a flexible air conducting means, a valve seat within said air conducting means and continuously integral therewith, a valve engaging said valve seat for releasably preventing the flow thru said air conducting means in one direction, a ferrule permanently mounted on an end of and extending axially outwardly of said air conducting means and resisting the radial dilation thereof, a radially inwardly extending flange on the end of said ferrule remote from said flexible air conducting means and defining an orifice opening into said flexible air conducting means, a closure normally cooperating with said ferrule flange for minimizing the entrance of objectionable quantities of dust and water into said air conducting means by substantially filling the orifice in said ferrule, means operatively joining said valve with said closure, and a spring yieldingly normally maintaining said valve in engagement with said valve seat and said closure in its normal position.

7. An air valve assembly substantially as shown, comprising in combination, a flexible air conducting means, a valve seat within said air conducting means and a structural part thereof, a valve engaging said valve seat and releasably arresting the flow of air thru said air conducting means, an outer ferrule mounted on an end of said air conducting means and extending beyond the end thereof, an outer ferrule flange spaced from the end of said air conducting means and defining an air conducting orifice thru which air may be admitted into said air conducting means, an inner ferrule disposed within and gripping said air conducting means and gripped by said outer ferrule for firmly securing both of said ferrules on an end of said air conducting means, a plug removably inserted in said orifice for minimizing the entrance of objectionable quantities of dust and water thereinto, a valve pin connecting said plug with said valve so that said valve may be operated by the operation of said plug, and pressure applying means yieldingly maintaining said valve on said valve seat.

8. An air valve assembly substantially as shown, comprising in combination, a flexible valve stem that is apertured axially for the conducting of air therethru and said aperture comprising a plurality of bores of different diameters, a downwardly facing valve seat interposed between two of said bores, a pair of ferrules firmly secured on one end of said valve stem, a flange part of one of said ferrules spaced axially from the end of said valve stem and defining an orifice admitting air into said aperture in said valve stem, a plug removably inserted in said orifice and cooperating with said ferrule flange for minimizing the admission of objectionable dust and water into said aperture in said valve stem, a valve removably contacting said valve seat for releasably closing said stem aperture to the passage of air therethru, a valve pin joining said plug with said valve so that said valve is unseated from said valve seat on the application of pressure on said plug, and resilient means for yieldingly closing said valve on the release of pressure on said plug.

9. An air valve assembly substantially as shown, comprising in combination, a flexible valve stem that is apertured axially for the conducting of air therethru and comprising a plurality of bores of different diameters, a downwardly faced valve seat at the junction of two of said bores and interposed between the ends of said valve stem, a valve removably seating on said valve seat, an inner ferrule disposed in said valve stem aperture, an inner ferrule radially outwardly extending flange overlying the end of said valve stem, an outer ferrule gripping the peripheral edge of said inner ferrule outwardly extending flange for securing said inner and said outer ferrules together with the end of the wall of the valve stem interposed therebetween, an outer ferrule flange disposed at the free end of said outer ferrule, a plug cooperating with said outer ferrule flange for minimizing the entrance of objectionable material into the interior of said outer ferrule, a valve pin extending from said plug to said valve and operatively joined to both, and a spring yieldingly pressing said valve into engagement with said valve seat and yieldingly maintaining said plug in proximity with said outer ferrule flange.

10. A valve assembly, comprising in combination, a flexible stem having an air conducting aperture extending axially thereof, an inner ferrule in said aperture, a stem gripping radially outwardly crimped part of said inner ferrule adjacent the axially inner end thereof disposed in said stem aperture and radially outwardly displacing a part of said stem, a radially outwardly extending flange portion of said inner ferrule adjacent the end of said stem, an outer ferrule disposed on said stem and extending axially therefrom to provide an inflation tool engageable connection for passing air thru said stem and said outer ferrule radially confining the part of said stem interposed between the said inner and outer ferrules substantially thruout the axial length of said inner ferrule for securing said inner ferrule and said outer ferrule on said stem, and said outer ferrule crimped around the radially outer edge of said inner ferrule flange for securing said ferrules together on said stem.

11. A valve assembly, comprising in combination, a flexible stem having an air conducting aperture extending axially thereof, an inner ferrule in said stem aperture, a stem gripping radially outwardly crimped part of said inner ferrule disposed at the lower end thereof in said stem aperture and radially outwardly displacing a part of said stem, a radially outwardly extending flange portion of said inner ferrule adjacent the end of said stem, an outer ferrule disposed on said stem and radially confining the part of said stem interposed between the said inner and outer ferrules substantially thruout the axial length of said inner ferrule, a radially inwardly extending flange at the upper extremity of said outer ferrule and axially spaced from the stem end and defining an orifice opening into said stem air conducting aperture, and an outer ferrule crimp gripping said inner ferrule flange and securing said ferrules in rigid assembly with each other.

12. A valve assembly, comprising in combination, a flexible stem having an air conducting aperture extending axially thereof, an inner ferrule in said stem aperture, a stem gripping part of said inner ferrule disposed in said stem aperture and radially displacing a part of said stem, a radially outwardly extending flange portion of said inner ferrule adjacent the end of said stem, an outer ferrule disposed on said stem and radially confining the part of said stem interposed between the said inner and outer ferrules substantially thruout the axial length of said inner ferrule, means firmly securing said outer and said inner ferrules together, and a radially inwardly extending flange forming the upper extremity of said outer ferrule and spaced axially from the inner ferrule flange and defining an orifice opening into said stem air conducting aperture.

13. A valve assembly, comprising in combination, a flexible stem having an air conducting aperture extending axially thereof, an inner ferrule in said aperture, a stem gripping part of said inner ferrule disposed in said stem aperture and radially outwardly displacing a part of said stem, a radially outwardly extending flange portion of said inner ferrule adjacent the end of said stem, an outer ferrule disposed on said stem and radially confining the part of said stem interposed between the said inner and outer ferrules substantially thruout the axial length of said inner ferrule for securing said ferrules on said stem, a radially inwardly extending flange at the upper extremity of said outer ferrule and spaced axially from said inner ferrule flange and said outer ferrule flange defining an orifice opening into said air conducting aperture in said stem, and means forming a part of one of said ferrules and pressing radially into the wall of said stem.

14. A rubber valve stem having a bore therethru, a rigid member lining the outer end of said bore and secured to said stem by a portion that is depressed into the wall of said stem, a second rigid member embracing the outer end of said stem and secured thereto by a portion that cooperates with said first stem depressing member to compress said wall therebetween, said second member extending beyond the end of said stem and shaped to provide a restricted orifice in communication with said bore, and said members having cooperating interlocked portions that secure them together.

15. An air valve assembly substantially as shown, comprising in combination, a flexible valve stem that is apertured for the passage of air therethru, a downwardly facing resilient valve seat portion of said stem disposed in said aperture, a valve releasably engaging said valve seat for arresting the flow of air thru said valve stem aperture, a valve pin controlling the operation of said valve, a closure plug on the end of said valve pin remote from said valve, a liner disposed in said stem aperture and extending axially thereof inwardly from the end of said stem, a ferrule permanently mounted on the end of said stem and overlying said liner axially of the stem thruout the length of said liner for firmly gripping the end of said stem between said liner and said ferrule and securing said liner and said ferrule permanently on the end of said stem, a ferrule flange at the end of said ferrule remote from its engagement with said stem and defining an orifice opening out of said stem aperture and said ferrule flange cooperating with said plug for minimizing the entrance of objectionable quantities of dust and water into said stem aperture, and resilient means yieldingly urging said valve toward said valve seat.

ARTHUR KEEFE.